US011916806B2

(12) United States Patent
Schulz

(10) Patent No.: US 11,916,806 B2
(45) Date of Patent: Feb. 27, 2024

(54) MONITORING A COMMUNICATION SYSTEM THAT IS USED FOR CONTROL AND/OR SURVEILLANCE OF AN INDUSTRIAL PROCESS

(71) Applicant: ABB Schweiz AG, Baden (CH)

(72) Inventor: Dirk Schulz, Meckenheim (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/731,522

(22) Filed: Apr. 28, 2022

(65) Prior Publication Data
US 2022/0353200 A1 Nov. 3, 2022

(30) Foreign Application Priority Data

Apr. 30, 2021 (EP) ..................................... 21171573

(51) Int. Cl.
*G06F 15/167* (2006.01)
*H04L 47/74* (2022.01)
(Continued)

(52) U.S. Cl.
CPC .......... *H04L 47/745* (2013.01); *H04L 41/065* (2013.01); *H04L 41/0654* (2013.01);
(Continued)

(58) Field of Classification Search
CPC . H04L 47/745; H04L 47/6295; H04L 47/746; H04L 47/805; H04L 47/245; H04L 43/0805; H04L 41/065; H04L 41/12; H04L 41/0654; H04W 28/0289; H04W 40/12; H04W 40/24
See application file for complete search history.

(56) References Cited

U.S. PATENT DOCUMENTS 11,108,860 B1 * 8/2021 Ellegaard ................ H04L 43/16
11,228,499 B1 * 1/2022 Maruyama .......... H04L 41/0823
(Continued)

FOREIGN PATENT DOCUMENTS

CN 105991376 A * 10/2016 ............... H04L 1/22
CN 109286516 A * 1/2019 .......... G06F 11/1464
(Continued)

OTHER PUBLICATIONS

European Patent Office, Extended European Search Report in European Application No. 21171573.5, 12 pp. (Oct. 1, 2021).

*Primary Examiner* — Richard G Keehn
(74) *Attorney, Agent, or Firm* — Leydig, Voit & Mayer, Ltd.

(57) ABSTRACT

A computer-implemented method for monitoring a communication system includes identifying a set of signals that need to be transmitted over the communication system for proper functioning of the control and/or surveillance; for each signal from the identified set of signals, identifying one or more resources of the communication system that are needed for transmission of this signal; obtaining information that is indicative of the operational state of the identified resources; and evaluating, from the obtained information, at least one remedial activity which, when performed on at least one resource, and/or on the control and/or surveillance, is likely to improve, and/or to restore, the reliability of the control and/or surveillance.

20 Claims, 3 Drawing Sheets

(51) Int. Cl.
  *H04L 47/6295* (2022.01)
  *H04L 47/80* (2022.01)
  *H04W 28/02* (2009.01)
  *H04L 41/12* (2022.01)
  *H04W 40/24* (2009.01)
  *H04L 41/0631* (2022.01)
  *H04L 43/0805* (2022.01)
  *H04W 40/12* (2009.01)
  *H04L 47/24* (2022.01)
  *H04L 41/0654* (2022.01)

(52) U.S. Cl.
  CPC .......... *H04L 41/12* (2013.01); *H04L 43/0805* (2013.01); *H04L 47/245* (2013.01); *H04L 47/6295* (2013.01); *H04L 47/746* (2013.01); *H04L 47/805* (2013.01); *H04W 28/0289* (2013.01); *H04W 40/12* (2013.01); *H04W 40/24* (2013.01)

(56) References Cited

U.S. PATENT DOCUMENTS

| | | | |
|---|---|---|---|
| 11,265,208 B1 * | 3/2022 | Massey | H04L 69/40 |
| 2002/0038156 A1 * | 3/2002 | Eryurek | G05B 23/0254 |
| | | | 700/29 |
| 2006/0224434 A1 * | 10/2006 | Rumi | G06Q 10/06 |
| | | | 705/7.42 |
| 2009/0274044 A1 * | 11/2009 | Goose | H04L 43/0811 |
| | | | 370/225 |
| 2016/0036602 A1 * | 2/2016 | Forguites | H04L 41/12 |
| | | | 370/404 |
| 2018/0367368 A1 * | 12/2018 | Schulz | G05B 19/4186 |

FOREIGN PATENT DOCUMENTS

| | | | | |
|---|---|---|---|---|
| CN | 109995545 A | * | 7/2019 | |
| CN | 111314148 A | * | 6/2020 | ......... H04L 41/0654 |
| CN | 112383432 A | * | 2/2021 | |
| EP | 2814285 A1 | * | 12/2014 | ............ H04W 24/10 |
| EP | 2814285 A1 | | 12/2014 | |
| EP | 2827207 A1 | * | 1/2015 | ......... H04L 12/6418 |
| EP | 3301523 A1 | * | 4/2018 | ........... G05B 19/058 |
| WO | WO 2017/092811 A1 | | 6/2017 | |
| WO | WO-2017092811 A1 | * | 6/2017 | |
| WO | WO-2019094729 A1 | * | 5/2019 | ............ H04L 41/12 |

* cited by examiner

MONITORING A COMMUNICATION SYSTEM THAT IS USED FOR CONTROL AND/OR SURVEILLANCE OF AN INDUSTRIAL PROCESS

CROSS-REFERENCE TO RELATED APPLICATIONS

This patent application claims priority to European Patent Application No. 21171573.5, filed on Apr. 30, 2021, which is incorporated herein in its entirety by reference.

FIELD OF THE DISCLOSURE

The present disclosure relates to improving the reliability of control and/or surveillance of industrial processes in a setting where such control and/or surveillance involves transmission of signals over a network.

BACKGROUND OF THE INVENTION

In a distributed control system, DCS, for an industrial process, low-level controllers send actuation signals to actors that act upon the physical behavior of the process and receive measurement values from sensors that are indicative of the current physical state of the process. The task of many such low-level controllers is to keep certain process variables at desired set-point values. The set-point values are supplied by a superordinate process control instance, so as to guide the process as a whole towards optimality according to any desired optimality criterion.

The functioning of the DCS is dependent on a reliable exchange of signals over a network infrastructure that connects the superordinate instance, the low-level controllers, the actors and the sensors. A failure in the network communication may impact the reliability of the DCS. Therefore, U.S. Pat. No. 10,505,786 B2 discloses a problem investigating device for a DCS with a root cause analysis unit that is able to identify a communication network element as a root cause for deviations of actual communication parameters from a corresponding communication requirement. To this end, the problem investigating device comprises a system model having software representations of process control endpoint devices interconnected via a communication network using a number of links.

BRIEF SUMMARY OF THE INVENTION

In a general aspect, the present disclosure improves the reliability of a distributed control system that uses a network infrastructure for communication even in settings where such network infrastructure is not completely under the control of the operator of the distributed control system. For example, in such a setting, the operator of the distributed control system may have a contract with a service provider for network connectivity, and this contract may specify connections with a certain quality of service.

BRIEF DESCRIPTION OF THE SEVERAL VIEWS OF THE DRAWING(S)

In the following, embodiments of the disclosure are illustrated using Figures without any intention to limit the scope of the invention.

DETAILED DESCRIPTION OF THE INVENTION

Figure 1:
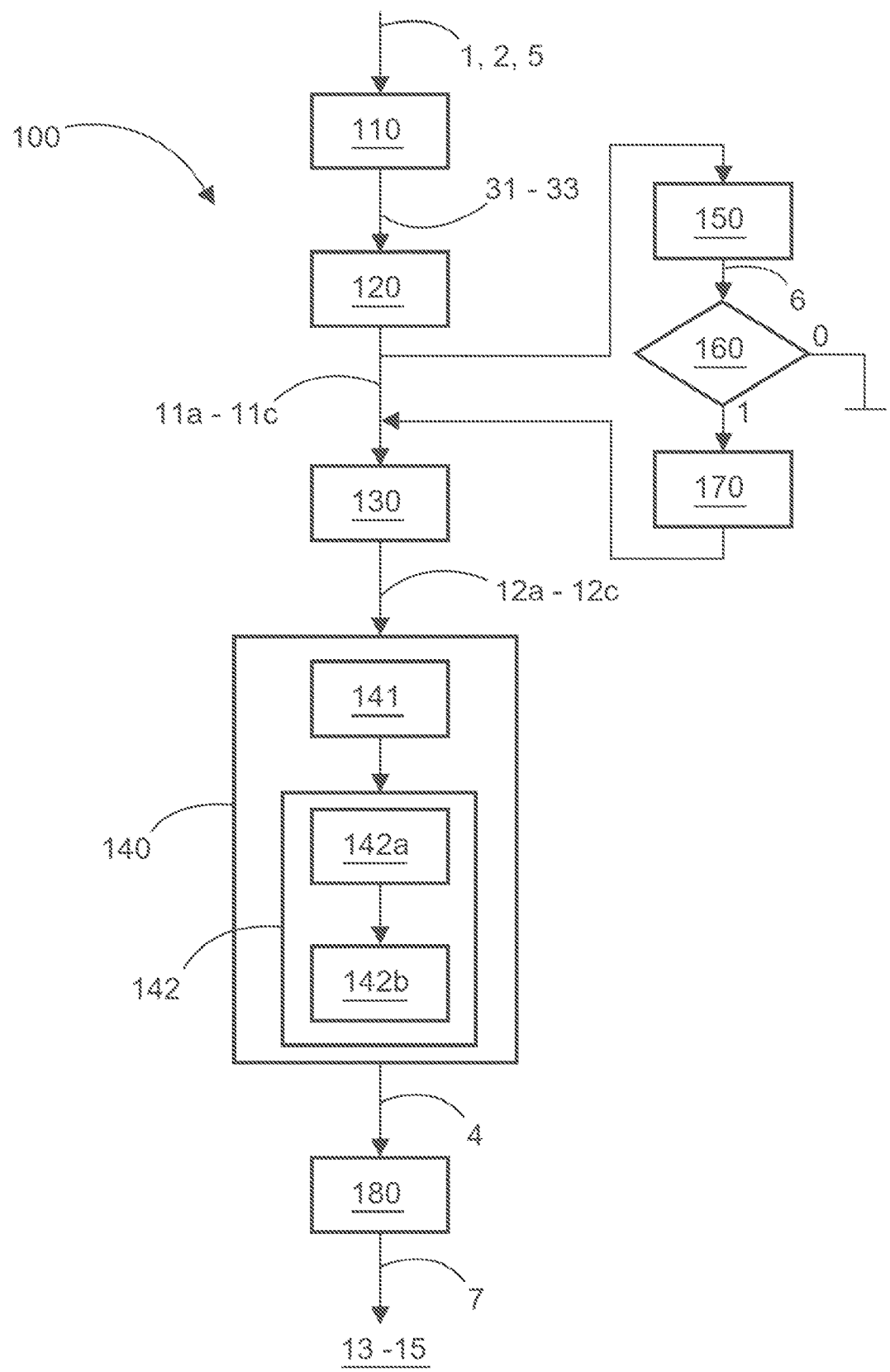
FIG. 1 illustrates an exemplary embodiment of a method for monitoring a communication system in accordance with the disclosure.

FIG. 1 is a schematic flow chart of an embodiment of the method 100 for monitoring a communication system 1. The method 100 starts from a situation where an industrial process 2 is controlled and/or surveilled, and this control and/or surveillance involves the use of a communication system 1.

In step 110, a set of signals 31-33 that need to be transmitted over the communication system 1 for proper functioning of the control and/or surveillance is identified.

In step 120, for each signal 31-33 from the identified set of signals, one or more resources 11a-11c of the communication system 1 that are needed for transmission of this signal 31-33 are identified.

In step 130, information 12a-12c that is indicative of the operational state of the identified resources 11a-11c is obtained.

In step 140, from the obtained information 12a-12c, at least one remedial activity 4 is evaluated. When this remedial activity 4 is performed on at least one resource 11a-11c, and/or on the control and/or surveillance, this remedial activity 4 is likely to improve, and/or to restore, the reliability of the control and/or surveillance.

According to block 141, the evaluating 140 of the remedial activity may comprise determining the importance of transmission of each signal 31-33 for the proper functioning of the control and/or surveillance. According to block 142, remedial activities that are likely to improve, and/or restore, the reliability of transmission of signals 31-33 may then be prioritized based on the determined importance of each of the respective signals 31-33.

According to block 142a, a quality-reduced and volume-reduced version of at least one signal 31-33 may be obtained. According to block 142b, the improving and/or restoring the reliability of transmission of this quality-reduced version may then be prioritized over the improving and/or restoring the reliability of transmission of the original signal 31-33, and/or of supplementary information that, together with the quality-reduced version, permits the reconstruction of the original signal 31-33.

In step 180, at least one remedial action 4 relating to at least one identified resource 11a-11c may be translated, by a provider of this identified resource 11a-11c, into a remedial action 7 relating to hardware and/or software 13-15 that is used to provide the resource 11a-11c.

In step 150, at least one virtual alarm object 6 that corresponds to the signal 31-33, and/or to an identified resource 11a-11c, may be created in a distributed control system, DCS 5, of the industrial process 2. It may then be checked in step 160 whether an identified resource 11a-11c causes further alarms in the DCS 5. If this is the case (truth value 1), the corresponding virtual alarm object may then be prioritized over alarm objects relating to the further alarms in step 170.

Figure 2:
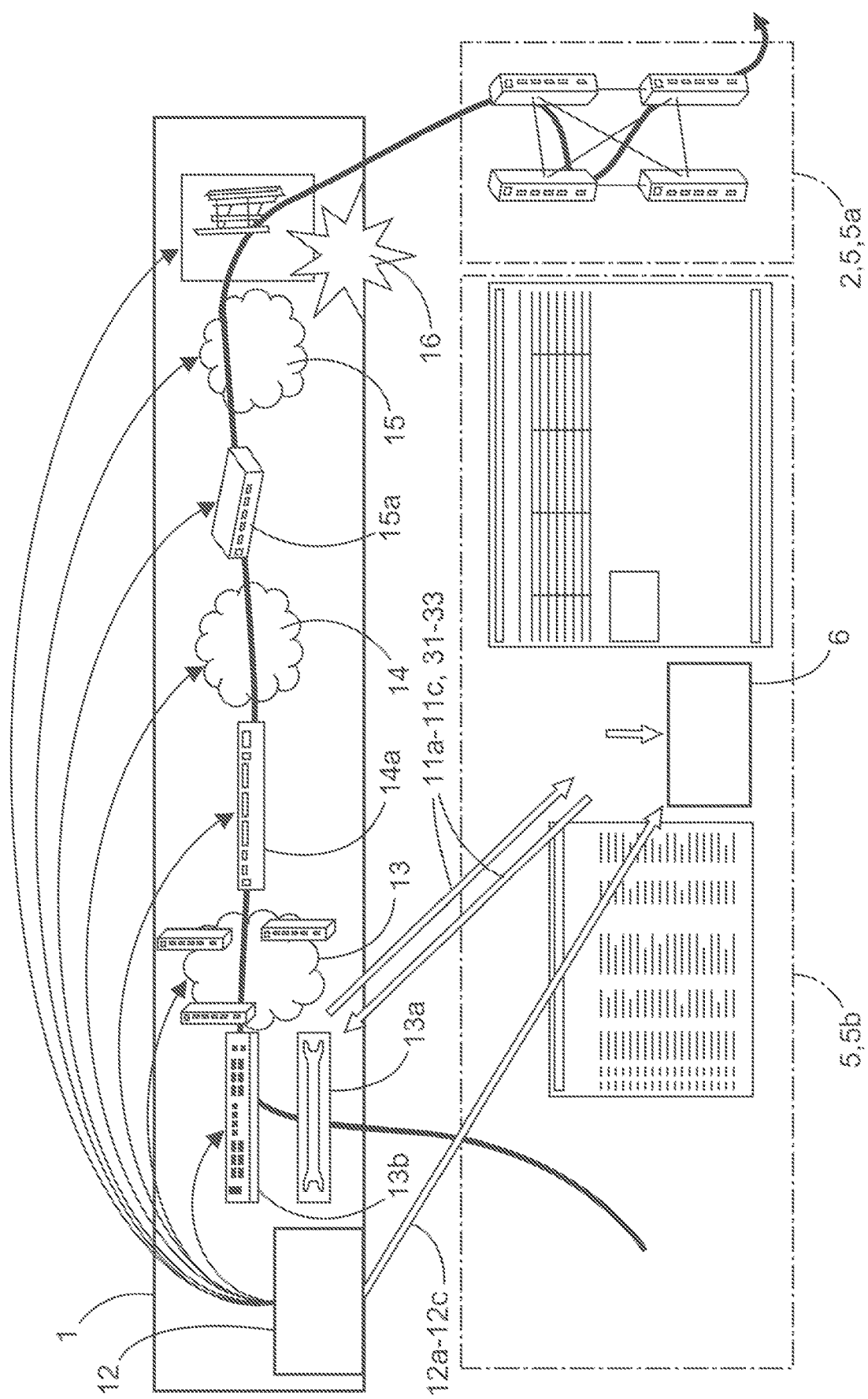
FIG. 2 illustrates an exemplary arrangement for controlling an industrial process over a communication system in accordance with the disclosure.

FIG. 2 shows an exemplary arrangement for controlling an industrial process 2 over a communication system 1.

The distributed control system 5 comprises a first part 5a that is located at the site where the industrial process 2 is run, and a second part 5*b* that is located remotely from this site. Communication of signals 31-33 between the two parts 5*a* and 5*b* is performed through resources 11*a*-11*c* provided by the communications system 1. In the example shown in FIG. 2, the communications system 1 is a private slice of a 5G network. The 5G network comprises a backhaul 13 with routers 13*a* and a translator 13*b* that provides a time-sensitive network, TSN, interface to the DCS 5; a mid-haul 14 with baseband units 14*a*; and a front-haul 15 with remote radio units 15*a*.

All this equipment is monitored by a monitoring entity 12. The monitoring entity 12 may be embodied as a programmable logic controller or computer having appropriate sensors. When a fault 16 occurs somewhere in the system and the functioning of a provided resource 11*a*-11*c* is affected, the monitoring entity may notify the DCS 5 about the non-availability of this resource 11*a*-11*c*, but not about the low-level fault 16 that caused this non-availability. The non-availability will then show up in a virtual alarm object 6 in the DCS 5.

Figure 3:
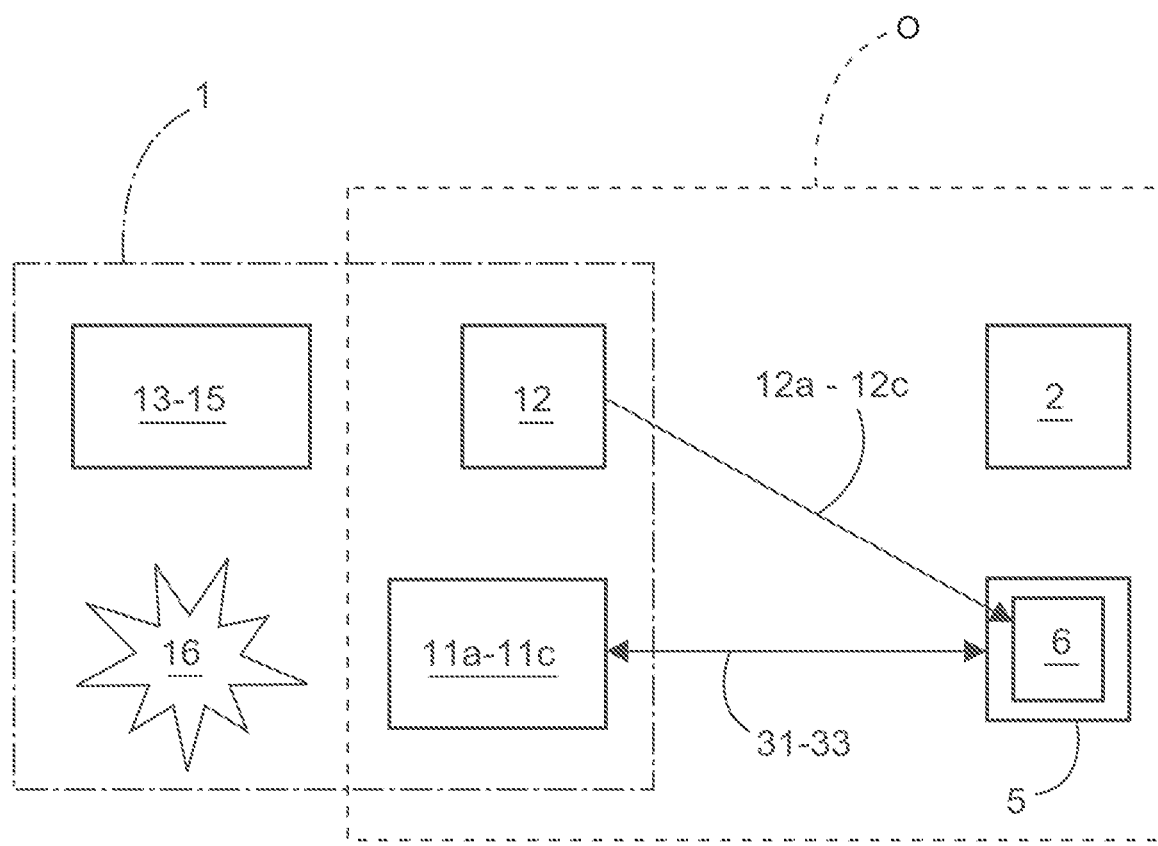
FIG. 3 illustrates realms of the communication system and a realm of the plant operator O in accordance with the disclosure.

FIG. 3 illustrates the partially overlapping realms of the communication system 1 and of the plant operator O. The details about the hardware and software 13-15 of the communication system 1 are solely within the realm of the communication system 1 and hidden from the plant operator O. The industrial process 2 and the DCS 5 are wholly within the realm of the plant operator O. The DCS 5 uses resources 11*a*-11*c* provided by the communication system 1 that are the interface between the two realms. Additionally, the monitoring entity 12 of the communication system 1 notifies the DCS 5 if a resource 11*a*-11*c* is unavailable by means of information 12*a*-12*c*, triggering the virtual alarm object 6 in the DCS.

In a general aspect, therefore, the disclosure describes a computer-implemented method for monitoring a communication system that is used for the control and/or the surveillance of at least one industrial process. In particular, control of the industrial process may comprise operating a distributed control system for the process that avails itself of the communication system. Surveillance may, for example, comprise observation with cameras or other sensors whose acquired data need to be transmitted over the communication system.

In the course of the method, signals that need to be transmitted over the communication system for proper functioning of the control and/or surveillance are identified. For example, the signals may comprise measurement values acquired by sensor, images or other surveillance data, actuation commands issued by low-level controllers, and/or setpoints issued by a superordinate process control instance.

For each signal from the identified set of signals, one or more resources of the communication system that are needed for transmission of this signal are identified. This information is available in the realm of the operator who performs the control and/or surveillance. Where the operator does not provide his own links and network devices, the procures concrete communication resources from one or more providers. He then assigns to-be-transmitted signals to the communication resources, and/or lets routers or other network devices distribute to-be-transmitted signals over multiple available communication resources. Either way, the resources needed for transmission of a particular signal are discoverable by machine.

The resource may be defined at an arbitrary level of abstraction. For example, at least one resource may comprise a service that provides transmission of data from a predetermined source to a predetermined destination with a predetermined bandwidth and/or a predetermined quality of service. Many network operators sell capacity at this level of abstraction, so that the customer does not get to see which physical resources the network operator uses to provide the resource. However, the resources may also comprise physical resources of the operator of the control and/or surveillance, as well as other types of resources, such as public dial-up circuit switched or packet switched networks.

Information that is indicative of the operational state of the identified resources is acquired. In particular, this acquiring may, for example, comprise active probing, passive monitoring, or subscribing to changes in state information. For example, active probing may comprise sending pings, keep-alives, heartbeats, or other probing messages through a resource in order to test whether a resource is still functional. Passive monitoring may, for example, comprise the monitoring of key performance indicators, KPI, of the communication, or the monitoring of event or error logs that relate to the communication, to the control, and/or to the surveillance. Providers of communication resources may, for example, offer current information on current planned or unplanned outages in a publish-subscribe model. For example, it may be published ahead of a scheduled maintenance that certain resources will be unavailable or available with reduced capacity.

The amount and level of detail of state information that is relevant in this context may, for example, depend on an agreed quality of service. For example, such quality of service may be specified in a Service Level Agreement, SLA. A change in state information may, for example, be deemed relevant if it has the potential to impact the agreed quality of service. In this manner, a lot of smaller changes may be filtered out.

Changes may also be filtered according to quantitative limits. For example, in an analogy to alarms in process control systems where "Hi" or "Lo" represents a first level of escalation and "HiHi" or "LoLo" represents a second level of escalation, subscriptions to changes in a quantitative parameter may be conditioned on relative or absolute thresholds for changes, and/or on trends or other predictions.

Relevant state information may also include information that is indicative or predictive of a future operational state. Such information may, for example, comprise a level of redundancy that is frequently agreed on in a service level agreement. If n-fold redundancy has been agreed upon and n−1 components fail at the same time, the communication resource will keep working for the moment, but the probability that it will fail in the future is increased. Therefore, a decrease in the available level of redundancy may be an important change in state information that the operator of the process wants to know about.

From the obtained information, at least one remedial activity is evaluated. This remedial activity is chosen such that it is likely to improve, and/or to restore, the reliability of the control and/or surveillance when it is performed on at least one resource of the communication system, and/or on the control and/or surveillance.

The types of remedial activities that are available depend on the type of the respective communication resource and the source from which this resource was procured. If it is a resource that the operator of the control and/or the surveillance owns and has physical access to, the remedial activity may include a maintenance and/or repair on a concrete network element and/or link. But targeted remedial activities are also possible if the resource was purchased from a network provider at the mentioned high level of abstraction. For example, the remedial activity may comprise one or more of:

sending a notification about a failure and/or degradation of at least one resource to a provider of this resource;

obtaining an additional resource that is capable to take over the traffic of a particular resource, so as to provide redundancy; and offloading traffic from one resource to at least one other resource.

That is, a remedial activity triggered in response to the failure or unavailability of a particular resource need not be limited in scope to this resource itself.

In a simple example, in the course of obtaining information that is indicative of the operational state, it may be discovered, through a message published by the network provider of a particular resource, that this resource will operate at a lesser level of redundancy over the weekend due to maintenance work. As a remedial action, a temporary additional resource may then be obtained. This additional resource is capable to take over the traffic of the affected resource, bringing the level of redundancy for this resource back to the desired level. Thus, the information that is indicative of the operational state of the identified resource may comprise planned maintenance outages of any equipment that is necessary to provide this resource.

In another example, in the course of obtaining information, it may be discovered that the transmission of certain signals is unsuccessful and errors accrue in the error log. This may be a first indication that a resource needed for the transmission of these signals is not available. Further probing may reveal that the resource in question is indeed not available. An alternative way of transmitting the signals may then be arranged. In particular, when communication resources are procured from one or more network providers, obtaining a new resource by machine may be as easy as issuing an API call to the network provider.

In particular, in a more complex system comprising many communication resources, the assignment between signals and communication resources need not be static. For example, depending on the workload, the signals may be routed via different communication resources at different times. Such dynamic assignments cannot reasonably be kept track of by a human operator, but they can be kept track of by machine. Therefore, by monitoring the used resources by machine, the probability is increased that in case of a failure of transmissions, the faulty resource is correctly identified, and the evaluated remedial activity targets the right problem. In particular, it causes an unnecessary delay if a notification about a failure and/or a degradation is sent to the wrong network provider whose network has nothing to do with a current problem in the control and/or surveillance.

The evaluating of the at least one remedial activity may, for example, comprise a simulation of the reliability of the control and/or surveillance under the assumption that a candidate remedial activity is implemented. Multiple candidate remedial activities may be tested, and the remedial activity that, according to the simulation, promises the best improvement of the reliability of the control and/or surveillance may be chosen to be implemented.

In a particularly advantageous embodiment, the evaluating at least one remedial activity comprises:

determining the importance of transmission of each signal for the proper functioning of the control and/or surveillance; and prioritizing remedial activities that are likely to improve, and/or restore, the reliability of transmission of signals based on the determined importance of each of the respective signals.

Some events may stop multiple signals from being transmitted at the same time, and it may not be possible to restore connectivity for all of them at the same time. For example, if a fiber-optic Internet connection that carries a communication resource breaks, and a microwave backup link is available, this microwave link will have a much lesser capacity than the fiber-optic connection. Thus, connectivity may be restored instantly only for a subset of the signals that were previously transmitted, and getting the remaining signals back on line will take significantly longer. By choosing the most important signals to be rerouted via the microwave link, the downtime of the control and/or surveillance caused by a failure of the fiber-optic connection may be reduced.

Also, in case of a larger outage in the network infrastructure managed by an external provider, it may speed up the process of getting at least transmission of the essential signals back on line if the external provider can be given some guidance as to which communication resources are most crucial. For example, the external provider may be sent a request of the kind, "Please focus on getting tunnel X from site A to site B back within the next hour. If tunnel Y comes back tomorrow and tunnel Z comes back within the next three days, our production can run unimpeded." This can be extremely helpful if there is a widespread failure in the network and the network provider does not know where to start in order to minimize the damage that the outage causes to customers. For example, spare equipment for repairs may be limited, and repair personnel cannot be everywhere at the same time.

For example, the importance of a signal may be determined based at least in part on one or more of:

a relevancy of the content of the signal for the control and/or the surveillance of the industrial process;

an importance of timely updates of this signal for the control and/or the surveillance of the industrial process; and/or the extent to which the signal is part of a feedback control loop in the control of the industrial process.

For example, only a subset of the measurement data captured by sensors in the process may be needed to sustain feedback control loops, whereas lack of certain other signals will not cause an immediate breakdown of the control and/or of the surveillance. For example, automated control by means of one or more feedback loops will still keep functioning while a high-bandwidth video stream from a surveillance camera is temporarily suspended. The same applies to some measurement values that are only acquired for archival, machine learning or diagnostic purposes, rather than for sustaining feedback loops. In another example, a video surveillance may temporarily be degraded to a lesser resolution, or to grayscale rather than color.

In one example, the signal may comprise at least one measurement value of a state variable of the industrial process. The importance of timely updates of this signal may then be based at least in part on a maximum slew rate with which the state variable is able to change in the context of the industrial process. For example, if the thermal mass of a reactor vessel slows variations of the temperature inside the vessel to a time scale on the order of seconds, it is not absolutely necessary to get updated temperature measurements every 100 milliseconds. By contrast, a pressure in the vessel may increase much quicker because there is no inertia corresponding to the thermal mass to be overcome. It is then much more important to get updated values for the pressure at short intervals.

Therefore, in a particularly advantageous embodiment, the industrial process is a chemical process. A signal that comprises a measurement value of a pressure is assigned a higher importance of timely updates than a signal that comprises a measurement value of a temperature.

Prioritizing of remedial activities is not limited to restoring and/or improving the reliability of entire signals. There may also be cases where certain small portions of a signal are much more important to keep the control and/or surveillance alive than the large remainder. Therefore, in another advantageous embodiment, the prioritizing of remedial activities may specifically comprise:

obtaining a quality-reduced and volume-reduced version of at least one signal; and prioritizing the improving and/or restoring the reliability of transmission of this quality-reduced version over the improving and/or restoring the reliability of transmission of the original signal, and/or of supplementary information that, together with the quality-reduced version, permits the reconstruction of the original signal.

In the example of a failed fiber-optic Internet connection, a high-volume color surveillance image may be switched to a lower resolution, and/or to grayscale, for transmission over the backup microwave link.

For example, obtaining a quality-reduced and volume-reduced version of a signal may comprise one or more of:

down sampling the signal;

rounding or cropping numerical values in the signal to a lesser precision;

compressing the signal with a lossy compression algorithm; and removing color information from at least one image in the signal.

For images, down sampling may relate to reducing the pixel resolution in each frame, and/or to reducing the frame rate per second. For time series data, down sampling may relate to increasing the time interval between consecutive values in the time series.

In a further advantageous embodiment, the remedial activity may comprise changing the control of the industrial process such that demand for at least one identified communication resource, and/or a redundancy requirement with respect to at least one identified resource, is reduced. In this manner, the industrial process may be kept running even in a situation where it is not possible to restore the communication to full bandwidth and/or full reliability. In the example of the broken fiber-optic connection, after the switchover to the microwave link, there is no more redundancy available because there is no other physical link to the outside. The industrial process may then be degraded to a mode of operation that can be operated without a requirement for redundancy. For example, the rate of throughput may be limited to a rate that is safe to run even without redundancy, and/or batches may be reduced so that a lesser quantity of an explosive intermediate product is present in the process at any one time.

In a further particularly advantageous embodiment, at least one virtual alarm object that corresponds to the signal, and/or to an identified resource, is created in a distributed control system, DCS, of the industrial process. In this manner, the communication infrastructure may be monitored by the DCS like an asset that is fully managed by the operator of the control, but without a necessity to mirror a whole physical infrastructure behind the communication resource into the DCS. Such mirroring would clutter the DCS with details that its operator might not be able to understand and/or use. Also, most network provides will not disclose the details of their physical infrastructure to their customers, so the mirroring into the DCS is not possible at all.

Advantageously, in response to a failure of an identified resource causing further alarms in the DCS, the virtual alarm object may be prioritized over other alarm objects relating to the further alarms. In this manner, the attention of the operator may be focused on restoring a lost connectivity if this is the root cause of further problems. In particular, if there is a problem in externally provided network infrastructure, it is advantageous to call upon the provider as soon as possible because a repair might take longer than a repair of on premise assets.

In a further particularly advantageous embodiment, a provider of an identified communication resource translates at least one remedial action relating to at least one identified resource that may, for example, be a logical or virtual resource, into a remedial action relating to hardware and/or software that is used to provide the resource. For example, the provider may be notified that a certain purchased individual connectivity slot from a source to a destination is not working. It is then only known on the side of the provider, but not on the side of the customer (here: the operator of the control and/or surveillance), which assets are being used to provide the resource. For example, these assets may include various landlines, microwave links, and pieces of network equipment (such as switches or routers). In particular, public land mobile communication networks have a rather complex hierarchical structure comprising a backhaul network, one or more midhaul networks with baseband units, and a plurality of remote radio units. All this complexity is hidden from the DCS. To the DCS, the whole mobile network may appear as a "virtual switch" in a time-sensitive network, TSN. But given the abstract communication resource that is not working, the provider of the network may find out which link, or which piece of network equipment, is the culprit.

In a particularly advantageous embodiment, the communication system comprises a subscription to a public cellular network with or without guaranteed service quality, and/or a subscription to a private network slice on a public cellular network with a service-level agreement. Although the network is a public one, the entire network core or parts of it, such as the packet gateway, may be privately owned. For example, the public cellular network may be a 5G public land mobile communication network. A private slice appears to the operator of the control and/or surveillance as a network of its own, while being provided by the same infrastructure that also carries a public 5G network. In the context of 5G, it is foreseen that a user of a private network slice gets some abstract diagnostic information about this slice that may be used to feed a virtual alarm object in the DCS. For example, the 5G network may notify the user that the level of redundancy agreed in the Service Level Agreement, SLA, is temporarily not available. But the user never gets to see the internal structure of the 5G network.

The methods may be wholly or partially computer-implemented. The invention therefore also provides one or more computer programs with machine readable instructions that, when executed on one or more computers, cause the one or more computers to perform the method described above. In particular, a virtualization platform and one or more hardware controllers may be regarded as computers.

The present disclosure also provides one or more non-transitory storage media and/or download products with the one or more computer programs. A download product is a product that may be sold in an online shop for immediate fulfillment by download. The invention also provides one or more computers with the one or more computer programs, and/or with the one or more non-transitory machine-readable storage media and/or download products.

Certain embodiments of the present disclosure may provide various advantages, including the following: Following trends like OPAS, Docker/Kubernetes, or 5G in automation is likely to break the tight coupling between DCS and DCS infrastructure because deterministic computation and connectivity is provided by 3rd party systems. To maintain today's deep integration of DCS and infrastructure during plant operation, e.g. to create system alarms for critical network conditions, we first create virtual system alarm or event sources in the DCS when requesting connectivity for signals and trigger them from events in the infrastructure.

Today, core control and system alarm & events are tightly coupled parts of the DCS. With open system architectures like OPAF, virtual container runtime environments like Docker or Kubernetes, or new connectivity ecosystems like 5G, this coupling is broken up: DCS and communication infrastructure become separate systems and insight from the DCS into the state of mission-critical system assets is lost.

The present disclosure enables generating virtual system alarm and event sources associated not with communication/computation equipment but with logical components of the control application like function blocks (running on compute nodes) or signals (running over networking nodes). When requesting the execution of functions or the transmission of signals from infrastructure management, we also subscribe to state change events for the related assets (monitored by the external management system). When receiving an event notification, the corresponding system alarm or event is raised in the DCS.

Today, system alarms and events are directly associated with system assets like controllers, IO modules, Fieldbus masters, etc. By breaking up the coupling of control and infrastructure, also the coupling of system alarms and events and infrastructure assets must be broken up and replaced by something novel. The present disclosure also goes beyond a basic event-mapping because we introduce the OT-specific notion of alarms and events and in particular introduce alarm state and acknowledgment concepts.

System alarms & events are natively generated by the runtime or network infrastructure management.

Prior to an event, the runtime or network infrastructure management provides (upon execution/connect request or a dedicated request) a list of assets that are monitored and that can be the root-cause of a potential future alarm or event. This allows the DCS to create a virtual alarm or event source for each system asset and to perform alarm or event aggregation during operation.

The runtime or network infrastructure management performs root-cause analysis and provides an identifier of the responsible asset along with root-cause, suggested and potentially planned actions for each event that it provides. If it is not possible to provide the exact responsible asset and root-cause, a list of potentially responsible assets and root-causes can be provided.

At this point, a CMMS as a third type of system should could be involved to support further root-cause analysis through manual or automated inspections (e.g. using drones), to remove the root-cause through repair or replacement, and to keep the DCS user informed about state and plan of these activities.

Since runtime or communication infrastructures are not aware of the distinction between alarms and events in the DCS and other OT-domain-specific properties such as severity, practices such as alarm acknowledgment by the operator (or an operator assistant) are unknown. To compensate this, a virtual alarm source with state is introduced on the DCS-side, which is created or set upon the rise of an infrastructure event mapped to a system alarm, but which can be acknowledged in a traditional manner regardless of any awareness in the infrastructure management.

As an alternative, the present disclosure explicitly introduces the OT-concept of alarms and events into infrastructure management for connectivity or computation systems like 5G core networks, Docker or Kubernetes.

LIST OF REFERENCE SIGNS 1 communication system
11a-11c resources provided by communication system 1
12 monitoring entity of communication system 1
12a-12c information about operational state of resources 11a-11c
13 backhaul of communication system 1
13a router of backhaul 13
13b translator of backhaul 13
14 mid-haul of communication system 1
14a baseband unit of mid-haul 14
15 front-haul of communication system 1
15a remote radio unit of front-haul 15
16 error in communication system 1
2 industrial process
31-33 signals for control and/or surveillance of process 2
4 remedial action to be performed on resources 11a-11c
5 distributed control system, DCS
5a first part of DCS 5 at site of process 2
5b second part of DCS 5 remote from site of process 2
6 virtual alarm object in DCS 5
7 remedial action to be performed in communication system 1
100 method for monitoring communication system 1
110 identifying signals 31-33
120 identifying resources 11a-11c for transmitting signals 31-33
130 obtaining state information 12a-12c of resources 11a-11c
140 evaluating remedial activity 4 from state information 12a-12c
141 determining importance of signals 31-33
142 prioritizing remedial activities 4
142a obtaining quality-reduced version of signal 31-33
142b prioritizing quality-reduced version of signal 31-33
150 creating virtual alarm object 6
160 checking whether failure 16 causes further alarms
170 prioritizing virtual alarm object 6 over further alarms
180 translating remedial action 4 to remedial action 7
O plant operator All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims)

are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer-implemented method for monitoring a communication system of a first entity that is used by a second entity for the control and/or the surveillance of at least one industrial process by a control system of the second entity, comprising the steps of:
    identifying, by the control system, a set of signals that need to be transmitted over the communication system for proper functioning of the control and/or surveillance of the at least one industrial process;
    for each signal from the identified set of signals, identifying, by the control system, one or more resources of the communication system that are needed for transmission of this signal;
    obtaining, from a monitoring entity of the communication system and by the control system, information that is indicative of the operational state of the identified resources; and
    evaluating, by the control system, from the obtained information, at least one remedial activity which, when performed on at least one resource, and/or on the control and/or surveillance, is likely to improve, and/or to restore, a reliability of the control and/or surveillance,
    wherein at least one resource of the one or more resources of the communication system comprises a service that provides transmission of data from a predetermined source to a predetermined destination with a predetermined bandwidth and/or a predetermined quality of the service, and
    wherein a change in state information regarding the at least one resource is deemed relevant based on a potential to impact the predetermined quality of the service.

2. The method of claim 1, wherein the remedial activity comprises one or more of:
    sending a notification about a failure and/or degradation of at least one resource to a provider of this resource;
    obtaining an additional resource that is capable to take over the traffic of a particular resource, so as to provide redundancy; and
    offloading traffic from one resource to at least one other resource.

3. The method of claim 1, wherein the evaluating at least one remedial activity comprises:
    determining the importance of transmission of each signal for the proper functioning of the control and/or surveillance; and
    prioritizing remedial activities that are likely to improve, and/or restore, the reliability of transmission of signals based on the determined importance of each of the respective signals.

4. The method of claim 3, wherein the importance of a signal is determined based at least in part on one or more of:
    a relevancy of the content of the signal for the control and/or the surveillance of the industrial process;
    an importance of timely updates of this signal for the control and/or the surveillance of the industrial process; and/or
    the extent to which the signal is part of a feedback control loop in the control of the industrial process.

5. The method of claim 4, wherein the signal comprises at least one measurement value of a state variable of the industrial process, and the importance of timely updates of this signal is based at least in part on a maximum slew rate with which the state variable is able to change in the context of the industrial process.

6. The method of claim 5, wherein the industrial process is a chemical process, and wherein a signal that comprises a measurement value of a pressure is assigned a higher importance of timely updates than a signal that comprises a measurement value of a temperature.

7. The method of claim 3, wherein the prioritizing of remedial activities specifically comprises:
    obtaining a quality-reduced and volume-reduced version of at least one signal; and
    prioritizing the improving and/or restoring the reliability of transmission of this quality-reduced version over the improving and/or restoring the reliability of transmission of the original signal, and/or of supplementary information that, together with the quality-reduced version, permits the reconstruction of the original signal.

8. The method of claim 7, wherein obtaining a quality-reduced and volume-reduced version of a signal comprises one or more of:
    downsampling the signal;
    rounding or cropping numerical values in the signal to a lesser precision;
    compressing the signal with a lossy compression algorithm; and
    removing color information from at least one image in the signal.

9. The method of claim 1, wherein the remedial activity comprises changing the control of the industrial process such that demand for at least one identified resource, and/or a redundancy requirement with respect to at least one identified resource, is reduced.

10. The method of claim 9, wherein changing the control of the industrial process further comprises limiting a rate of throughput, and/or reducing a size of batches of the industrial process.

11. The method of claim 1, further comprising creating, in a distributed control system, DCS, of the industrial process, at least one virtual alarm object that corresponds to the signal, and/or to an identified resource.

12. The method of claim 11, further comprising:
in response to a failure of an identified resource causing further alarms in the DCS, prioritizing the virtual alarm object over alarm objects relating to the further alarms.

13. The method of claim 1, further comprising translating, by a provider of an identified resource, at least one remedial action relating to at least one identified resource into a remedial action relating to hardware and/or software that is used to provide the resource.

14. The method of claim 1, wherein the communication system comprises a subscription to a public cellular network with or without guaranteed service quality, and/or a subscription to a private network slice on a public cellular network with a service-level agreement.

15. The method of claim 1, wherein the information that is indicative of the operational state of the identified resources comprises a decrease in an available level of redundancy.

16. The method of claim 1, wherein evaluating, from the obtained information, at least one remedial activity further comprises:
simulating, for a plurality of candidate remedial activities of the at least one remedial activity, the reliability of the control and/or surveillance under an assumption that a candidate remedial activity is implemented; and
implementing a remedial activity of the plurality of remedial activities that, according to the simulation, provides a best improvement of the reliability of the control and/or surveillance.

17. The method of claim 1, wherein obtaining information that is indicative of the operational state of the identified resources further comprises obtaining the change in state information; and
wherein evaluating, from the obtained information, at least one remedial activity further comprises evaluating at least one remedial activity based on the change in state information that is deemed relevant.

18. The method of claim 1, wherein evaluating, by the control system, from the obtained information, at least one remedial activity further comprises:
based on the obtained information, prioritizing a reduced version of the identified set of signals such that the identified set of signals can be reconstructed based on the reduced version of the identified set of signals and, when available, supplementary information.

19. The method of claim 18, wherein the reduced version of the identified set of signals comprises a quality-reduced and volume-reduced version of the identified set of signals, and wherein prioritizing a reduced version of the identified set of signals further comprises prioritizing a reduced version of the identified set of signals and the supplementary information to the reduced version of the identified set of signals.

20. The method of claim 1, wherein access to a network configuration of the one or more resources is controlled by the first entity and excludes the second entity.

* * * * *